United States Patent
Fan (10) Patent No.: US 9,734,418 B2
(45) Date of Patent: Aug. 15, 2017

(54) METHODS FOR IDENTITY AUTHENTICATION AND HANDHELD ELECTRONIC DEVICES UTILIZING THE SAME

(71) Applicant: HTC Corporation, Taoyuan, Taoyuan County (TW)

(72) Inventor: Fu-Cheng Fan, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 330 days.

(21) Appl. No.: 14/158,247

(22) Filed: Jan. 17, 2014

(65) Prior Publication Data

US 2015/0206019 A1    Jul. 23, 2015

(51) Int. Cl.
G06K 9/00    (2006.01)
G06K 9/20    (2006.01)

(52) U.S. Cl.
CPC ....... *G06K 9/2027* (2013.01); *G06K 9/00604* (2013.01)

(58) Field of Classification Search
None
See application file for complete search history.

(56) References Cited

U.S. PATENT DOCUMENTS

| | | | | |
|---|---|---|---|---|
| 5,291,560 A | * | 3/1994 | Daugman | A61B 3/1216 351/206 |
| 8,374,404 B2 | | 2/2013 | Williams et al. | |
| 2008/0253622 A1 | * | 10/2008 | Tosa | G06K 9/00604 382/117 |
| 2009/0208064 A1 | * | 8/2009 | Cambier | G06K 9/0061 382/110 |
| 2011/0015945 A1 | * | 1/2011 | Addy | G06F 19/3462 705/3 |
| 2011/0138176 A1 | * | 6/2011 | Mansour | H04L 9/3218 713/168 |
| 2011/0309755 A1 | * | 12/2011 | Wirth | H05B 33/0872 315/151 |
| 2013/0088685 A1 | * | 4/2013 | Holland | G06K 9/00604 351/206 |
| 2014/0341441 A1 | * | 11/2014 | Slaby | G06F 21/32 382/117 |

* cited by examiner

*Primary Examiner* — Christopher S Kelley
*Assistant Examiner* — Kaitlin A Retallick
(74) *Attorney, Agent, or Firm* — Birch, Stewart, Kolasch & Birch, LLP (57) ABSTRACT

A handheld electronic device includes a camera module, a flashlight module and a processor. The processor is configured to generate a flashlight indication signal having one or more pulse(s) distributed over time, direct the flashlight module to turn on a first light and a second light at different time based on the flashlight indication signal, direct the camera module to take pictures to obtain a stream of biological characteristic images comprising one or more first biological characteristic image(s) obtained when the first light is turned on and one or more second biological characteristic image(s) obtained when the second light is turned on, and compare the first biological characteristic image(s) with a first reference signature and compare the second biological characteristic image(s) with a second reference signature to obtain an identity authentication result.

19 Claims, 7 Drawing Sheets

FIG. 7

METHODS FOR IDENTITY AUTHENTICATION AND HANDHELD ELECTRONIC DEVICES UTILIZING THE SAME

BACKGROUND OF THE INVENTION

Field of the Invention

The invention relates to a handheld electronic device, and more particularly to a handheld electronic device with improved security protection in identity authentication.

Description of the Related Art

The use of biometric indicia for identification purposes requires that a particular biometric factor be unique for each individual, that it be readily measured, and that it be invariant over time. Although many indicia have been proposed over the years, fingerprints are perhaps the most familiar example of a successful biometric identification scheme. As is well known, no two fingerprints are the same, and they do not change except through injury or surgery. It is equally clear, however, that identification through fingerprints suffers from the significant drawback of requiring physical contact with the person. No method exists for obtaining a fingerprint from a distance.

A biometric indicator that has gained popularity in the last decade is the iris. The iris of every human eye has unique texture features of high complexity, which prove to be essentially immutable over a person's life. No two irises are identical in texture or detail, even in the same person. The spatial diversity of the iris reflected in the texture features can be used as a unique biometric indicator.

No matter whether fingerprints, iris or other biometric factors, the use of biometric indicia for identification is a field worthy of further development.

BRIEF SUMMARY OF THE INVENTION

Handheld electronic devices and methods for identity authentication are provided. An exemplary embodiment of a handheld electronic device comprises a camera module, a flashlight module and a processor. The camera module is configured to take pictures. The flashlight module is configured to generate at least a first light having a first spectrum and a second light having a second spectrum. The processor is configured to generate a flashlight indication signal having one or more pulse(s) distributed over time, direct the flashlight module to turn on the first light and the second light at different times based on the flashlight indication signal, direct the camera module to take pictures to obtain a stream of biological characteristic images comprising one or more first biological characteristic image(s) obtained when the first light is turned on and one or more second biological characteristic image(s) obtained when the second light is turned on, and compare the first biological characteristic image(s) with a first reference signature and compare the second biological characteristic image(s) with a second reference signature to obtain an identity authentication result.

An exemplary embodiment of a method for identity authentication comprises: generating a flashlight indication signal, wherein the flashlight indication signal has one or more pulse(s) distributed over time; turning on a first light and a second light at different time based on the flashlight indication signal, wherein a distribution of the pulse(s) of the flashlight indication signal has a predetermined pattern, and the first light and the second light are sequentially turned on or off based on the predetermined pattern; taking pictures to obtain a stream of biological characteristic images comprising one or more first biological characteristic image(s) obtained when the first light is turned on and one or more second biological characteristic image(s) obtained when the second light is turned on; and comparing the first biological characteristic image(s) with a first reference signature and comparing the second biological characteristic image(s) with a second reference signature to obtain an identity authentication result. The identity authentication result is a positive match when the first biological characteristic image(s) substantially match the first reference signature and the second biological characteristic image(s) substantially match the second reference signature.

Another exemplary embodiment of a method for identity authentication comprises: generating a flashlight indication signal, wherein the flashlight indication signal has one or more pulse(s) distributed over time and a distribution of the pulse(s) of the flashlight indication signal have a predetermined pattern; turning on at least a first light based on the flashlight indication signal, wherein the first light is turned on and off based on the predetermined pattern; taking pictures to obtain a stream of biological characteristic images comprising one or more first biological characteristic image(s) obtained when the first light is turned on and one or more second biological characteristic image(s) obtained when the first light is turned off; and comparing the first biological characteristic image(s) with a first reference signature and comparing the second biological characteristic image(s) with a second reference signature to obtain an identity authentication result. The identity authentication result is a positive match when the first biological characteristic image(s) substantially match the first reference signature and the second biological characteristic image(s) substantially match the second reference signature.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
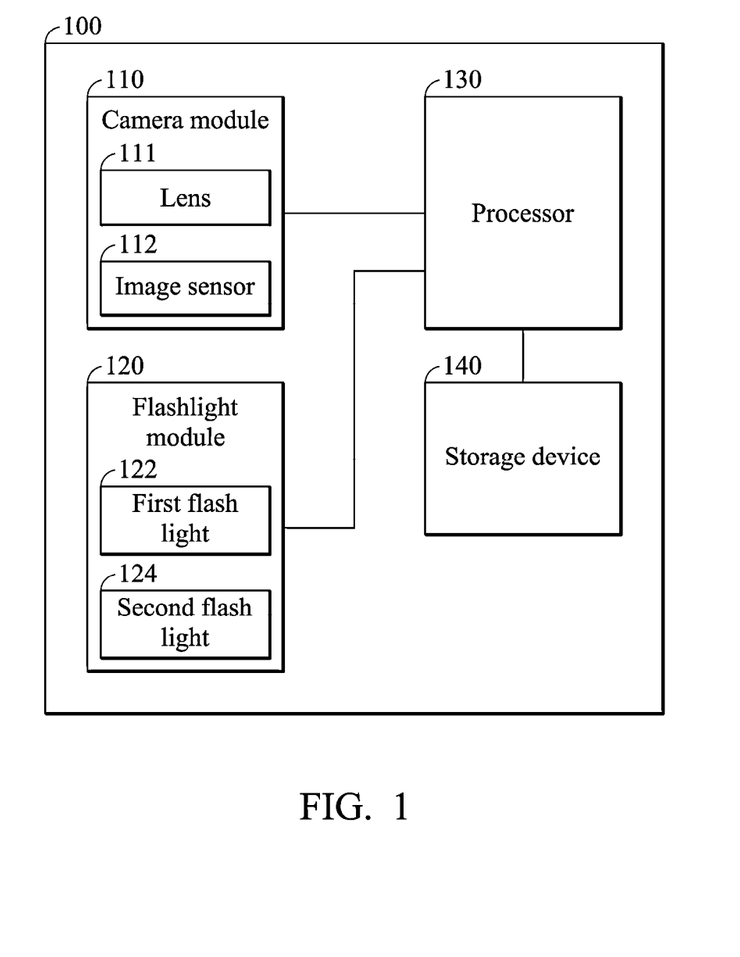
FIG. 1 is a schematic block diagram of a handheld electronic device according to an embodiment of the invention.

FIG. 1 is a schematic block diagram of a handheld electronic device according to an embodiment of the invention. The handheld electronic device 100 may at least comprise a camera module 110, a flashlight module 120, a processor 130 and a storage device 140. The camera module 110 may at least comprise a lens 111 and an image sensor 112 and is configured to take pictures. The flashlight module 120 may comprise one or more light sources and is configured to generate one or more lights. For example, the flashlight module 120 may comprise a first flash light 122 configured to generate a first light and a second flash light 124 positioned near to the first flash light 122 and configured to generate a second light. The processor 130 is configured to control the camera module 110, the flashlight module 120, and the storage device 140. The storage device 140 is configured to store system and user data, such as a database comprising a plurality of reference signatures for each user. The reference signature may be regarded as a biological characteristic image with a predetermined texture pattern unique for each individual.

Note that in order to clarify the concept of the invention, FIG. 1 presents a simplified block diagram, in which only the elements relevant to the invention are shown. However, the invention should not be limited what is shown in FIG. 1. For example, the handheld electronic device 100 may further comprise an antenna module, a communications module, a signal processing module, or other elements not shown in FIG. 1.

Figure 2A:
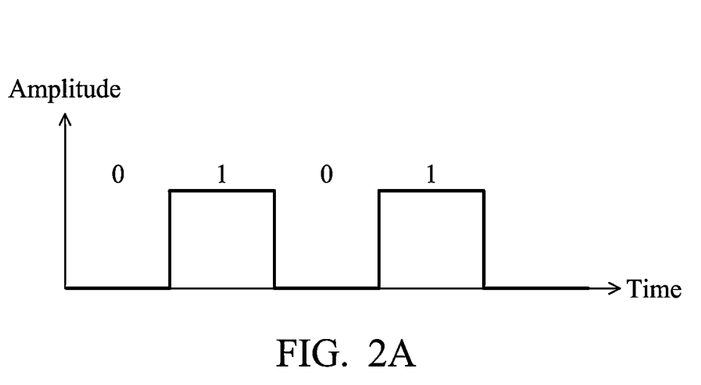
FIG. 2A shows an exemplary waveform of a flashlight indication signal according to an embodiment of the invention.
Figure 2B:
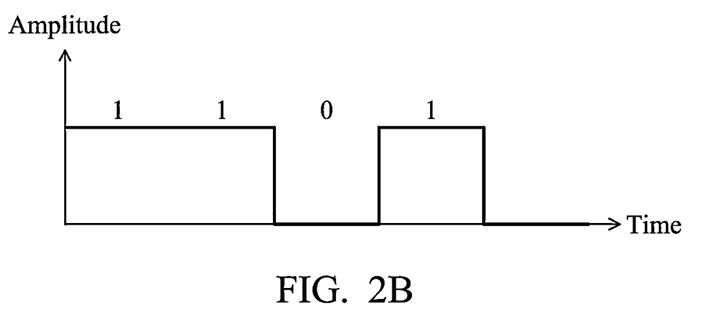
FIG. 2B shows another exemplary waveform of a flashlight indication signal according to another embodiment of the invention.

According to an embodiment of the invention, the processor 130 may generate a flashlight indication signal having one or more pulse(s) distributed over time, and the processor 130 may randomly generate the flashlight indication signal. FIG. 2A shows an exemplary waveform of a flashlight indication signal according to an embodiment of the invention. According to an embodiment of the invention, a distribution of the pulse(s) of the flashlight indication signal has a predetermined pattern. The predetermined pattern may be formed by a plurality of bits each having two possible values: '0' and '1', where '0' means no pulse is asserted and '1' means a pulse is asserted. For example, in the embodiment shown in FIG. 2A, the predetermined pattern is 0101. FIG. 2B shows another exemplary waveform of a flashlight indication signal according to another embodiment of the invention. In the embodiment shown in FIG. 2B, the predetermined pattern is 1101.

Note that in some embodiments of the invention, the processor 130 may also randomly generate the predetermined pattern first, and then generate the flashlight indication signal based on the predetermined pattern, where a distribution of the pulse(s) follows the predetermined pattern. In the embodiments, the flashlight indication signal generated based on an exemplary predetermined pattern 0101 may refer to FIG. 2A, and the flashlight indication signal generated based on an exemplary predetermined pattern 1101 may refer to FIG. 2B.

In the embodiments of the invention, the processor 130 may randomly generate the flashlight indication signal or the predetermined pattern based on one or more random seed(s), and may further direct the flashlight module to turn on one or more light based on the predetermined pattern or the flashlight indication signal, so as to produce different lighting conditions to facilitate the photographic operations of the camera module 110 for capturing different biological characteristic images in an identity authentication procedure.

For example, suppose that one light is utilized for capturing biological characteristic images in the identity authentication procedure and the light is turned on and off by the flashlight module 120 based on the predetermined pattern. When the predetermined pattern is 0101, the processor 130 may direct the camera module to take at least four pictures, where the first picture is taken when the light is turned on, the second picture is taken when the light is turned off, the third picture is taken when the light is turned on and the fourth picture is taken when the light is turned off. Note that the first and third pictures may also be taken when the light is turned off while the second and fourth pictures may be taken when the light is turned on, and the invention should not be limited thereto.

For another example, suppose that two different lights are utilized for capturing different biological characteristic images in the identity authentication procedure and the two lights are turned on by the flashlight module 120 at different time based on the predetermined pattern. When the predetermined pattern is 1101, the processor 130 may direct the camera module to take at least four pictures, where the first and second pictures are taken when a first light is turned on, the third picture is taken when a second light is turned on and the fourth picture is taken when the first light is turned on. Note that the first, second and fourth pictures may also be taken when the second light is turned on while the third picture may be taken when the first light is turned on, and the invention should not be limited thereto.

Note that the randomly generated flashlight indication signal or the predetermined pattern is utilized for indicating the sequence of producing different lighting conditions, such that the flashlight module 120 may know the sequence of turning on and off one or more lights. Note further that in the embodiments of the invention, the time and duration of turning on and off the one or more lights are independent from the pulse width or duration of the flashlight indication signal.

Figure 3A:
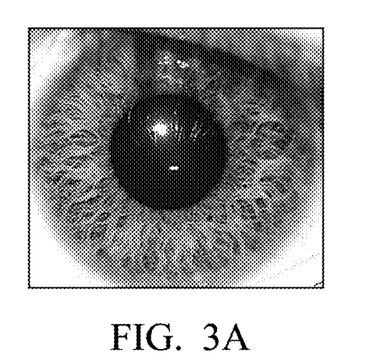
FIG. 3A shows an exemplary biological characteristic image obtained under white light according to an embodiment of the invention.
Figure 3B:
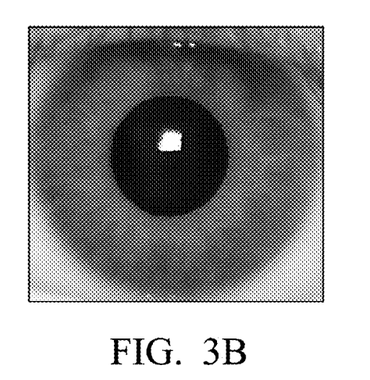
FIG. 3B shows an exemplary biological characteristic image obtained under infrared according to an embodiment of the invention.

FIG. 3A and FIG. 3B respectively show different biological characteristic images obtained under different lighting conditions according to an embodiment of the invention. The object in FIG. 3A and FIG. 3B was the iris of the same person, where the biological characteristic image shown in FIG. 3A is obtained by taking a picture of the iris under a white light and the biological characteristic image shown in FIG. 3B was obtained by taking a picture of the iris under an infrared. As shown in FIG. 3A and FIG. 3B, when taking pictures of the iris of the same person under different lighting conditions, the obtained biological characteristic images may have distinguishable texture patterns.

According to an embodiment of the invention, the purpose of producing different lighting conditions in the identity authentication procedure is to obtain different biological characteristic images with distinguishable texture patterns. In addition, in the embodiments of the invention, the predetermined pattern utilized for controlling the sequence of generating different lights is also an important factor in the identity authentication procedure. Since the predetermined pattern is randomly generated, it makes the sequence of reference signatures utilized for comparing with the stream of biological characteristic images hard to predict or fake. The proposed methods for identity authentication utilizing different lighting conditions are further discussed in the following paragraphs.

Figure 4:
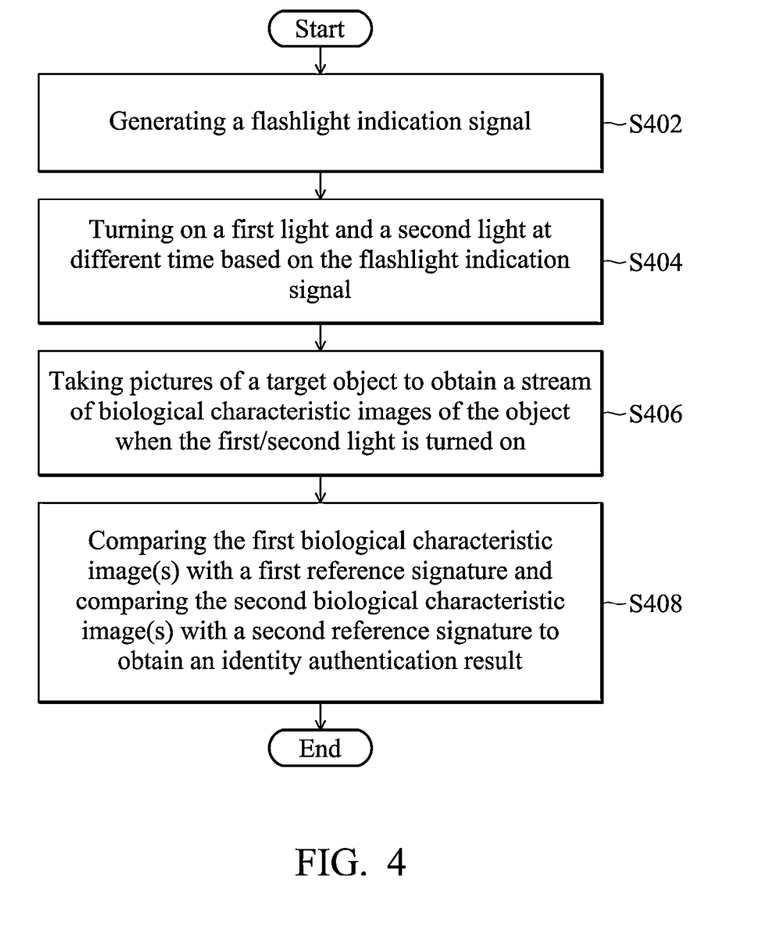
FIG. 4 shows a flow chart of a method for identity authentication according to an embodiment of the invention.

FIG. 4 shows a flow chart of a method for identity authentication according to an embodiment of the invention. In the embodiment, two lights are utilized for identity authentication. The processor 130 may first generate a flashlight indication signal (Step S402). The flashlight indication signal has one or more pulse(s) distributed over time and a distribution of the pulse(s) of the flashlight indication signal has a predetermined pattern. Note that as discussed above, the processor 130 may randomly generate the flashlight indication signal. In addition, in some embodiments, the processor 130 may also randomly generate the predetermined pattern and generate the flashlight indication signal based on the predetermined pattern in step S402, and the invention should not be limited thereto.

Next, the processor 130 may transmit the flashlight indication signal to the flashlight module 120 and direct the flashlight module to turn on a first light and a second light at different time based on the flashlight indication signal (or, the predetermined pattern) (Step S404). Next, the processor 130 may direct the camera module 110 to take pictures of a target object, so to obtain a stream of biological characteristic images of the target object when the first/second light is turned on (Step S406). The stream of biological characteristic images may comprises one or more first biological characteristic image(s) obtained when the first light is turned on and one or more second biological characteristic image(s) obtained when the second light is turned on.

Note that for each time when either the first light or the second light is turned on, the camera module 110 may take more than one picture of the target object until one qualified biological characteristic image with proper focus value, sharpness and/or clearness (or other photographic parameters for evaluating the quality of captured images) can be obtained from the pictures.

According to the embodiment of the invention, the image sensor 112 in the camera module 110 is capable of sensing different types of light generated by the flashlight module 120. After obtaining the stream of biological characteristic images, the processor 130 further compares the first biological characteristic image(s) with a first reference signature, and compares the second biological characteristic image(s) with a second reference signature to obtain an identity authentication result (Step S408).

According to an embodiment of the invention, the identity authentication result is a positive match only when the first biological characteristic image(s) substantially match the first reference signature and the second biological characteristic image(s) substantially match the second reference signature.

Figure 5A:
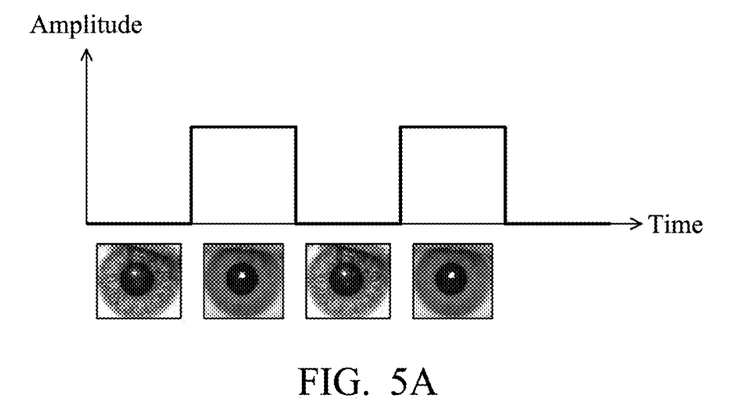
FIG. 5A shows an exemplary waveform of a flashlight indication signal as in FIG. 2A with respect to the sequence of reference signatures provided for comparing with the stream of obtained biological characteristic images according to an embodiment of the invention.

Referring back to the exemplary biological characteristic images shown in FIG. 3A and FIG. 3B, suppose the biological characteristic image shown in FIG. 3A is a first reference signature obtained under the first light and stored in the database for a specific user and the biological characteristic image shown in FIG. 3B is a second reference signature obtained under the second light and stored in the database for the same user. FIG. 5A shows an exemplary waveform of a flashlight indication signal as shown in FIG. 2A with respect to the sequence of reference signatures provided for comparing with the stream of obtained biological characteristic images according to an embodiment of the invention. In the embodiment as shown in FIG. 5A, when the predetermined pattern is 0101, the waveform of the flashlight indication signal is shown in the upper portion and the sequence of reference signatures provided for comparing with the stream of biological characteristic images is shown in the lower portion, where the first light and the second light are turned on by turns based on the predetermined pattern 0101, the '0' represents the first light being turned on and the '1' represents the second light being turned on. Suppose the stream of biological characteristic images comprises four images F1, F2, F3 and F4 obtained in sequence, the identity authentication result is a positive match only when the first image F1 matches the first reference signature, the second image F2 matches the second reference signature, the third image F3 matches with the first reference signature, and the fourth image F4 matches with the second reference signature.

Figure 5B:
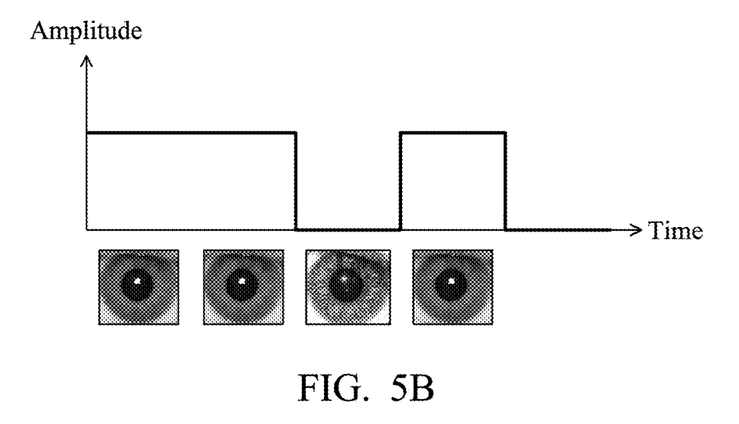
FIG. 5B shows another exemplary waveform of a flashlight indication signal as in FIG. 2B with respect to the sequence of reference signatures provided for comparing with the stream of obtained biological characteristic images according to an embodiment of the invention.

FIG. 5B shows another exemplary waveform of a flashlight indication signal as shown in FIG. 2B with respect to the sequence of reference signatures provided for comparing with the stream of obtained biological characteristic images according to an embodiment of the invention. In the embodiment as shown in FIG. 5B, when the predetermined pattern is 1101, the waveform of the flashlight indication signal is shown in the upper portion and the sequence of reference signatures provided for comparing with the stream of biological characteristic images is shown in the lower portion, where the first light and the second light are turned on by turns based on the predetermined pattern 1101, the '0' represents the first light being turned on and the '1' represents the second light being turned on. Suppose the stream of biological characteristic images comprises four images F1, F2, F3 and F4 obtained in sequence, the identity authentication result is a positive match only when the first image F1 matches with the second reference signature, the second image F2 matches with the second reference signature, the third image F3 matches with the first reference signature, and the fourth image F4 matches with the second reference signature.

According to an embodiment of the invention, the first light generated by the flashlight module 120 may have a first spectrum and the second light generated by the flashlight module 120 may have a second spectrum. The first spectrum may be different from the second spectrum, such that a biological characteristic image obtained when taking a picture of an object as the first light is turned on has a texture pattern that is distinguishable from a texture pattern of a biological characteristic image obtained when taking a picture of the same object as the second light is turned on. For example, the first light may be white light, the second light may be infrared and the biological characteristic images obtained when taking a picture of an object as the first and second light are turned on may be referred to in FIG. 3A and FIG. 3B.

According to another embodiment of the invention, the first light generated by the flashlight module 120 may have a first wavelength range and the second light generated by the flashlight module 120 may have a second wavelength range, and the first wavelength range is different from the second wavelength range. According to yet another embodiment of the invention, the first light generated by the flashlight module 120 may have a first wavelength range and a first spectral intensity curve and the second light generated by the flashlight module 120 may have a second wavelength range and a second spectral intensity curve, and the first wavelength range is substantially the same as the second wavelength range but the first spectral intensity curve is different from the second spectral intensity curve.

Figure 6:
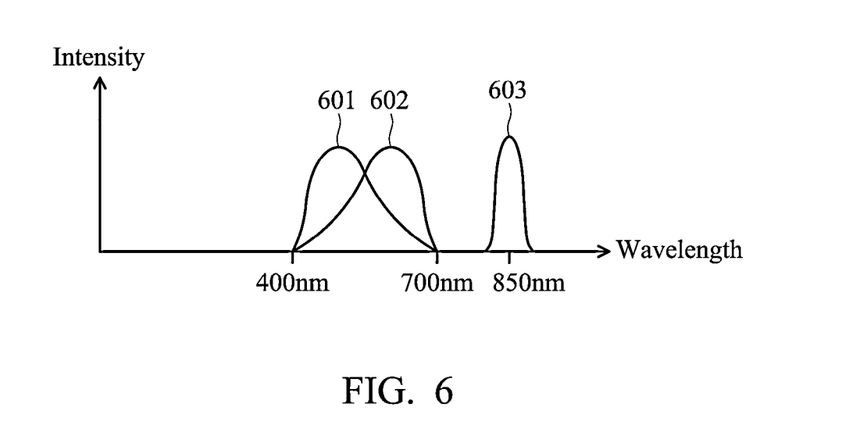
FIG. 6 shows an exemplary spectrum according to an embodiment of the invention.

FIG. 6 shows an exemplary spectrum according to an embodiment of the invention. In FIG. 6, three exemplary spectral intensity curves 601, 602 and 603 are shown, and each spectral intensity curve may correspond to a light. As shown in FIG. 6, the spectral intensity curves 601 and 602 cover substantially the same wavelength range but have different shapes. Therefore, the light corresponding to the spectral intensity curves 601 and 602 have substantially the same wavelength range but different spectral intensity curves. In addition, the spectral intensity curves 601 and 603 cover different wavelength ranges. Therefore, the light corresponding to the spectral intensity curves 601 and 603 have different wavelength ranges.

Note that in the embodiments, the first light and the second light may both be invisible light, both be visible light, or one may be a visible light and the other one may be an invisible light. The invention should not be limited to any case.

Note further that the flashlight module 120 may also generate more than two lights or only one light based on the predetermined pattern or the flashlight indication signal, so as to produce different lighting conditions to facilitate the photographic operations of the camera module 110 for capturing distinguishable biological characteristic images in the identity authentication procedure. The embodiments of using more than two lights for capturing different biological characteristic images in the identity authentication procedure are easy for those who are skilled in this technology to deduce from the embodiments as illustrated above, and are omitted here for brevity.

Figure 7:
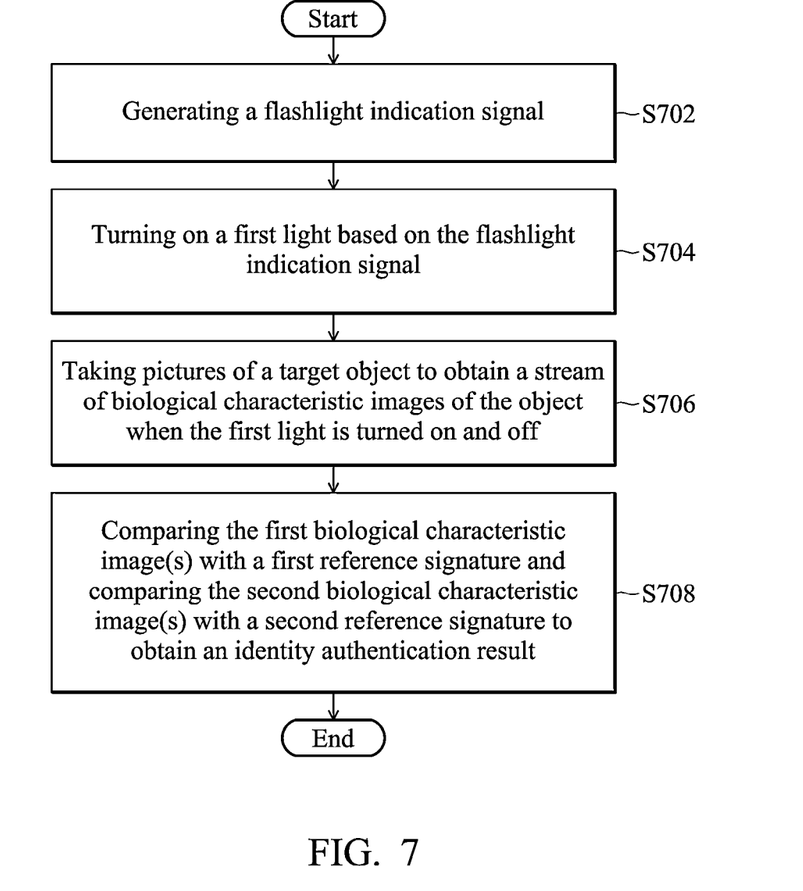
FIG. 7 shows a flow chart of a method for identity authentication according to another embodiment of the invention.

FIG. 7 shows a flow chart of a method for identity authentication according to another embodiment of the invention. In the embodiment, only one light is utilized for identity authentication. The processor 130 may first generate a flashlight indication signal (Step S702). The flashlight indication signal has one or more pulse(s) distributed over time and a distribution of the pulse(s) of the flashlight indication signal has a predetermined pattern. Note that as discussed above, the processor 130 may randomly generate the flashlight indication signal. In addition, in some embodiments, the processor 130 may also randomly generate the predetermined pattern and generate the flashlight indication signal based on the predetermined pattern in step S702, and the invention should not be limited thereto.

Next, the processor 130 may transmit the flashlight indication signal to the flashlight module 120 and direct the flashlight module to turn on a first light based on the flashlight indication signal (or, the predetermined pattern) (Step S704). Next, the processor 130 may direct the camera module 110 to take pictures of a target object, so as to obtain a stream of biological characteristic images of the target object when the first light is turned on and off (Step S706). The stream of biological characteristic images may comprise one or more first biological characteristic image(s) obtained when the first light is turned on and one or more second biological characteristic image(s) obtained when the first light is turned off.

Note that in the embodiment, the first light should be selected as the light for a biological characteristic image obtained when taking a picture of an object as the first light is turned on has a texture pattern that is distinguishable from a texture pattern of a biological characteristic image obtained when taking a picture of the same object as the first light is turned off. For example, the first light may be infrared.

Note further that each time the first light is turned on or off, the camera module 110 may take more than one picture of the target object until one qualified biological characteristic image with proper focus value, sharpness and/or clearness (or other photographic parameters for evaluating the quality of captured images) can be obtained from the pictures.

After obtaining the stream of biological characteristic images, the processor 130 further compares the first biological characteristic image(s) with a first reference signature, and compares the second biological characteristic image(s) with a second reference signature to obtain an identity authentication result (Step S708).

According to an embodiment of the invention, the identity authentication result is a positive match only when the first biological characteristic image(s) substantially match the first reference signature and the second biological characteristic image(s) substantially match the second reference signature.

As discussed above, in the proposed identity authentication methods, since the predetermined pattern is randomly generated, the sequence of reference signatures utilized for comparing with the stream of biological characteristic images is hard to predict or fake. Therefore, the security against malicious accessing of the handheld electronic device 100 can be upgraded.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A handheld electronic device, comprising:
a camera module, configured to take pictures;
a flashlight module, configured to generate at least a first light having a first spectrum and a second light having a second spectrum; and
a processor, configured to:
randomly generate a flashlight indication signal having one or more pulse(s) distributed over time;
direct the flashlight module to turn on the first light and the second light at different times based on the flashlight indication signal;
direct the camera module to take pictures to obtain a stream of biological characteristic images comprising one or more first biological characteristic image(s) obtained when the first light is turned on and one or more second biological characteristic image(s) obtained when the second light is turned on;
retrieve a first reference signature associated with the first light and pre-stored in the handheld electronic device, and a second reference signature associated with the second light and pre-stored in the handheld electronic device;
generate a sequence of reference signatures by using the first reference signature and the second reference signature according to the randomly generated flashlight indication signal, wherein an order of the first reference signature and the second reference signature arranged in the sequence of reference signatures follows an order of turning on the first light and the second light at said different times; and compare the stream of biological characteristic images with the sequence of reference signatures to obtain an identity authentication result, wherein the first reference signature has a first texture pattern, the second reference signature has a second texture pattern, and the first texture pattern is different from the second texture pattern, and wherein the identity authentication result is a positive match when the first biological characteristic image(s) substantially match the first reference signature, the second biological characteristic image(s) substantially match the second reference signature and an order of the first biological characteristic image(s) and the second biological characteristic image(s) obtained in the stream of biological characteristic images matches the order of the first reference signature and the second reference signature arranged in the sequence of reference signatures.

2. The handheld electronic device as claimed in claim 1, wherein a distribution of the pulse(s) of the flashlight indication signal has a predetermined pattern, and the first light and the second light are sequentially turned on and off based on the predetermined pattern.

3. The handheld electronic device as claimed in claim 1, wherein the first spectrum is different from the second spectrum, such that a biological characteristic image obtained when taking a picture of an object as the first light is turned on has a texture pattern that is distinguishable from a texture pattern of a biological characteristic image obtained when taking a picture of the same object as the second light is turned on.

4. The handheld electronic device as claimed in claim 1, wherein the first light has a first wavelength range and the second light has a second wavelength range, and the first wavelength range is different from the second wavelength range.

5. The handheld electronic device as claimed in claim 1, wherein the first light has a first wavelength range and a first spectral intensity curve and the second light has a second wavelength range and a second spectral intensity curve, and wherein the first wavelength range is substantially the same as the second wavelength range but the first spectral intensity curve is different from the second spectral intensity curve.

6. The handheld electronic device as claimed in claim 1, wherein the first light is a visible light and the second light is an invisible light.

7. The handheld electronic device as claimed in claim 1, wherein the first light and the second light are both invisible light.

8. The handheld electronic device as claimed in claim 1, wherein the first light and the second light are both visible light.

9. The handheld electronic device as claimed in claim 1, wherein the flashlight indication signal is randomly generated.

10. The handheld electronic device as claimed in claim 1, the flashlight module further comprise a first flash light configured to generate the first light having the first spectrum and a second flash light positioned near to the first flash light and configured to generate the second light having a second spectrum.

11. A method for identity authentication, comprising:

randomly generating a flashlight indication signal, wherein the flashlight indication signal has one or more pulse(s) distributed over time;

turning on a first light and a second light at different times based on the flashlight indication signal, wherein a distribution of the pulse(s) of the flashlight indication signal has a predetermined pattern, and the first light and the second light are sequentially turned on or off based on the predetermined pattern;

taking pictures to obtain a stream of biological characteristic images comprising one or more first biological characteristic image(s) obtained when the first light is turned on and one or more second biological characteristic image(s) obtained when the second light is turned on;

retrieve a first reference signature associated with the first light and pre-stored in the handheld electronic device, and a second reference signature associated with the second light and pre-stored in the handheld electronic device;

generate a sequence of reference signatures by using the first reference signature and the second reference signature according to the predetermined pattern of the randomly generated flashlight indication signal, wherein an order of the first reference signature and the second reference signature arranged in the sequence of reference signatures follows an order of turning on the first light and the second light at said different times; and comparing the stream of biological characteristic images with the sequence of reference signatures to obtain an identity authentication result, wherein the identity authentication result is a positive match when the first biological characteristic image(s) substantially match the first reference signature, the second biological characteristic image(s) substantially match the second reference signature, and an order of the first biological characteristic image(s) and the second biological characteristic image(s) obtained in the stream of biological characteristic images matches the order of the first reference signature and the second reference signature arranged in the sequence of reference signatures, and wherein the first reference signature has a first texture pattern, the second reference signature has a second texture pattern, and the first texture pattern is different from the second texture pattern.

12. The method as claimed in claim 11, wherein the first light has a first spectrum and the second light has a second spectrum and the first spectrum is different from the second spectrum.

13. The method as claimed in claim 11, wherein the first light has a first wavelength range and the second light has a second wavelength range, and the first wavelength range is different from the second wavelength range.

14. The method as claimed in claim 11, wherein the first light has a first wavelength range and a first spectral intensity curve and the second light has a second wavelength range and a second spectral intensity curve, and wherein the first wavelength range is substantially the same as the second wavelength range but the first spectral intensity curve is different from the second spectral intensity curve.

15. The method as claimed in claim 11, wherein the first light and the second light are different light, such that a biological characteristic image obtained when taking a picture of an object as the first light is turned on has a texture pattern that is distinguishable from a texture pattern of a biological characteristic image obtained when taking a picture of the same object as the second light is turned on.

16. The method as claimed in claim 11, wherein the flashlight indication signal is randomly generated.

17. A method for identity authentication, comprising:
randomly generating a flashlight indication signal, wherein the flashlight indication signal has one or more pulse(s) distributed over time and a distribution of the pulse(s) of the flashlight indication signal have a predetermined pattern;
turning on at least a first light based on the flashlight indication signal, wherein the first light is turned on and off based on the predetermined pattern;
taking pictures to obtain a stream of biological characteristic images comprising one or more first biological characteristic image(s) obtained when the first light is turned on and one or more second biological characteristic image(s) obtained when the first light is turned off;
retrieve a first reference signature associated with the first light being turned on and pre-stored in the handheld electronic device, and a second reference signature associated with the first light being turned off and pre-stored in the handheld electronic device;
generating a sequence of reference signatures by using the first reference signature and the second reference signature according to the predetermined pattern of the randomly generated flashlight indication signal, wherein an order of the first reference signature and the second reference signature arranged in the sequence of reference signatures follows an order of turning on the first light and turning off the first light at said different times; and
comparing the stream of biological characteristic images with the sequence of reference signatures to obtain an identity authentication result,
wherein the identity authentication result is a positive match when the first biological characteristic image(s) substantially match the first reference signature, the second biological characteristic image(s) substantially match the second reference signature, and an order of the first biological characteristic image(s) and the second biological characteristic image(s) obtained in the stream of biological characteristic images matches the order of the first reference signature and the second reference signature arranged in the sequence of reference signatures, and
wherein the first reference signature has a first texture pattern, the second reference signature has a second texture pattern, and the first texture pattern is different from the second texture pattern.

18. The method as claimed in claim 17, wherein a biological characteristic image obtained when taking a picture of an object as the first light is turned on has a texture pattern that is distinguishable from a texture pattern of a biological characteristic image obtained when taking a picture of the same object as the first light is turned off.

19. The method as claimed in claim 17, wherein the flashlight indication signal is randomly generated.

\* \* \* \* \*